US007831733B2

(12) United States Patent
Sultan et al.

(10) Patent No.: US 7,831,733 B2
(45) Date of Patent: Nov. 9, 2010

(54) POLICY-BASED FORWARDING IN OPEN SHORTEST PATH FIRST (OSPF) NETWORKS

(75) Inventors: Nevein T. Sultan, Ottawa (CA); Dwight D. Jamieson, Ottawa (CA); Valerie A. Simpson, Stittsville (CA)

(73) Assignee: Avaya Holdings Limited, Basking Ridge, NJ (US)

( * ) Notice: Subject to any disclaimer, the term of this patent is extended or adjusted under 35 U.S.C. 154(b) by 1758 days.

(21) Appl. No.: 09/899,265

(22) Filed: Jul. 6, 2001

(65) Prior Publication Data
US 2003/0014540 A1    Jan. 16, 2003

(51) Int. Cl.
*G06F 15/173*    (2006.01)
(52) U.S. Cl. .................. 709/238; 709/242; 709/240
(58) Field of Classification Search ................ 370/351; 709/240, 238
See application file for complete search history.

(56) References Cited

U.S. PATENT DOCUMENTS

| | | | | | |
|---|---|---|---|---|---|
| 5,265,092 | A | * | 11/1993 | Soloway et al. | 370/238 |
| 5,825,772 | A | * | 10/1998 | Dobbins et al. | 370/396 |
| 5,917,820 | A | * | 6/1999 | Rekhter | 370/392 |
| 6,275,492 | B1 | * | 8/2001 | Zhang | 370/392 |
| 6,347,090 | B1 | * | 2/2002 | Ooms et al. | 370/428 |
| 6,473,421 | B1 | * | 10/2002 | Tappan | 370/351 |
| 6,597,663 | B1 | * | 7/2003 | Rekhter | 370/252 |
| 6,606,325 | B1 | * | 8/2003 | Cain | 370/410 |
| 6,650,626 | B1 | * | 11/2003 | Cain | 370/256 |
| 6,823,395 | B1 | * | 11/2004 | Adolfsson | 709/242 |
| 6,871,235 | B1 | * | 3/2005 | Cain | 709/239 |
| 6,928,483 | B1 | * | 8/2005 | Cain | 709/238 |
| 6,950,424 | B2 | * | 9/2005 | Galand et al. | 370/351 |
| 7,082,473 | B2 | * | 7/2006 | Breitbart et al. | 709/241 |
| 2001/0032272 | A1 | * | 10/2001 | Fujita | 709/241 |
| 2002/0078232 | A1 | * | 6/2002 | Simpson et al. | 709/238 |

OTHER PUBLICATIONS

Enke Chen: Internet Draft—Address Prefix Based Outbound Route Filter for BGP-4, Expiration Date Apr. 2001.
Radia Perlman: Article—A Comparison Between Two Routing Protocols: OSPF and IS-IS, dated Sep. 1991.
Coltun, R. et al. "OSPF for IPv6", Request for Comments 2740, Dec. 1999.
Varadhan, K. et al. "BGP4/IDRP for IP—OSPF Interaction", Request for Comments 1745, Dec. 1994.

* cited by examiner

*Primary Examiner*—Ramsey Refai
(74) *Attorney, Agent, or Firm*—Kent Daniels; Blake, Cassels & Graydon LLP

(57) ABSTRACT

A method and system enables policy-based traffic forwarding in a data network by implementing policy-based control over propagation of LSA messages through the data network. A route tag is asserted in respect of a link state advertisement (LSA) message advertising a network address. Propagation of the LSA through the data network is controlled using the asserted internal route tag. At each hop, a policy decision affecting the forwarding of the LSA is made. Exemplary policy decisions include, Pass and Discard. In addition, the forwarding table may be updated using the route and address information contained in the LSA. In this case, routes entered in the forwarding table may be tagged as an inclusion route or an exclusion route. This may be based on the value of an exclusion route flag, which can, for example, be provided as a binary "0" or "1" inserted into an unused portion of the options field of the LSA.

28 Claims, 3 Drawing Sheets

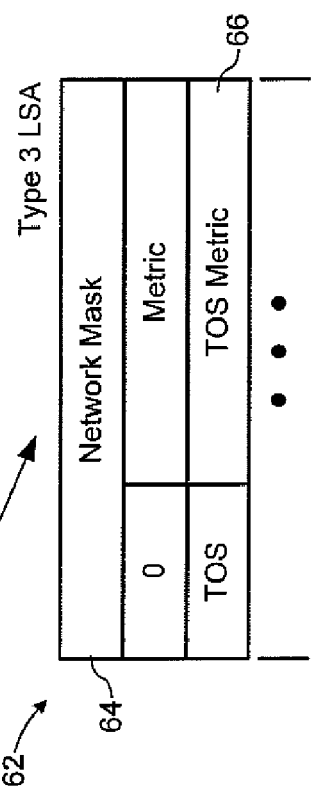
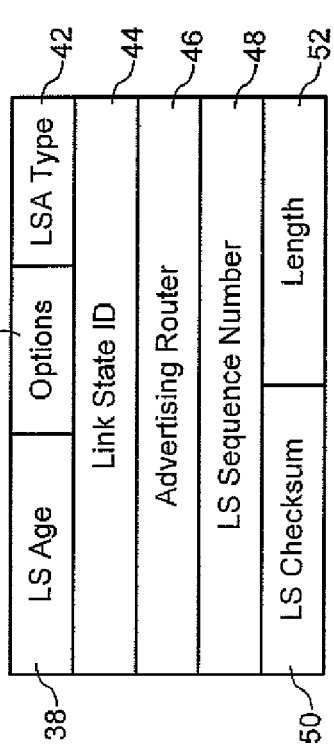
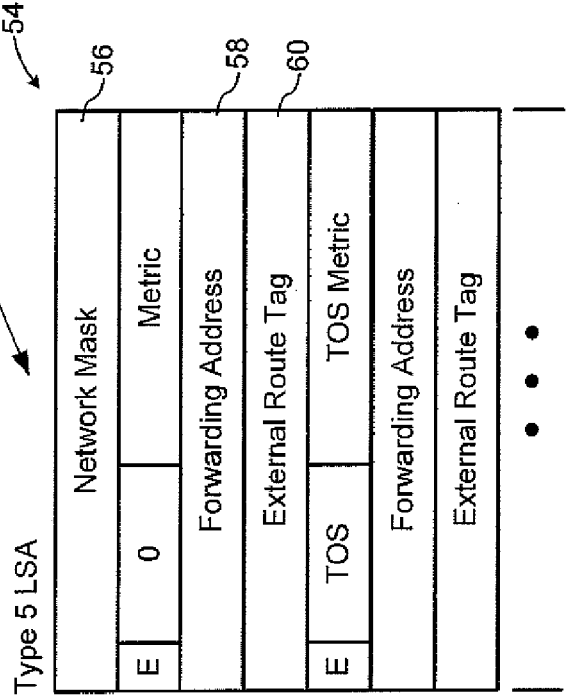
Figure 3a
Figure 3b
Figure 3c

POLICY-BASED FORWARDING IN OPEN SHORTEST PATH FIRST (OSPF) NETWORKS

CROSS-REFERENCE TO RELATED APPLICATIONS

This is the first application filed for the present invention.

MICROFICHE APPENDIX

Not Applicable.

TECHNICAL FIELD

The present invention relates to routing protocols for connectionless traffic in a data network, and in particular to policy-based forwarding in Open Shortest Path First (OSPF) networks.

BACKGROUND OF THE INVENTION

The modern data network space is made up of a plurality of Autonomous Systems (ASs) that are directly or indirectly linked to a communications network, such as the public internet. In this respect, it will be noted that the classical definition of an "autonomous system" refers to a set of one or more routers under a single technical administration, using an Interior Gateway Protocol (IGP) and common metrics to route packets within the autonomous system, and using an Exterior Gateway Protocol (EGP) to route packets to other autonomous systems. Since this classic definition was developed, it has become common for single autonomous systems to use several interior gateway protocols and sometimes several different sets of metrics within the AS. In the present application, the term Autonomous System (AS) is used to emphasize the fact that, even when multiple IGPs and metrics are used, the technical administration of an AS appears to other autonomous systems to have a single coherent interior routing plan and presents a consistent picture of what destinations are reachable through it.

FIG. 1 is a block diagram showing a typical autonomous system 2 having three areas 4a-c (Area 0.0.0.1, Area 0.0.0.2 and Area 0.0.0.3) that are linked to a backbone network 6 via two Area Border Routers (ABRs) 8 and to a communications network 10 such as the public internet via an Autonomous System Border Router (ASBR) 12. Each area 4 includes one or more Internal Routers (IRs) 14, which control the forwarding of traffic among user machines 16 (e.g. client PCs and content servers) and respective ABRs 8 hosting the area 4. Each of the routers 8,14 are coupled together via links 18 (which may be physical or logical links) through which packetized data is forwarded.

The topology of the autonomous system 2 illustrated in FIG. 1 is typical of that set up within an enterprise or campus Local Area Network (LAN) to connect various domains (e.g. departmental LANs) represented by each area 4 to the communications network 10. Traffic forwarding external to the autonomous system 2 (both to and from the autonomous system 2), is controlled by the ASBR 12 using an Exterior Gateway Protocol (EGP) such as Border Gateway Protocol (BGP) in a manner known in the art. Within the autonomous system 2, traffic forwarding is controlled using an Interior Gateway Protocol (IGP) such as Open Shortest Path First (OSPF) protocol.

Using this arrangement, information concerning addresses located outside the autonomous system 2, and reachable through the communications network 10, can be obtained using BGP messages received by the ASBR 12. BGP route information received in this manner is checked against predetermined OSPF policies, which control the generation of Type-5 (and/or Type-7, if the autonomous system 2 is an NSSA area) Link State Advertisement (LSA) messages by the ASBR 12. The BGP route information is then propagated through the autonomous system 2 by flooding the Type-5 (or Type-7) LSAs into the autonomous system 2, such that each router 8,12,14 in the autonomous system 2 obtains the BGP route information, and can write appropriate entries into its respective forwarding table (not shown).

Typically, information concerning addresses within an area in the autonomous system 2 is propagated throughout the autonomous system 2 by flooding Type-3 LSAs into the autonomous system 2 from the ABR 8 hosting the involved address. This enables each router 8,12,14 in the autonomous system 2 to obtain the internal route information, and write appropriate entries into its respective forwarding table.

As is well known in the art, the routing of traffic within the autonomous system 2 is controlled by the forwarding table maintained by each router, which maps packets received by a router 8,12,14 to downstream links 18 connected to the router, typically on the basis of the contents of the destination address field of the traffic header. Exemplary data fields within the forwarding table include: IP Address; Mask; Next Hop and Next Hop Interface. As each packet arrives at a router, its destination address is read and used to query the forwarding table. If a matching route in the forwarding table is located, the corresponding Next Hop and Next Hop Interface fields are used to forward the packet to a downstream link towards its destination. Otherwise, the packet is discarded.

The routes identified in a conventional forwarding table are always "inclusionary", in the sense that a router can forward packets to any route (or address) identified in the forwarding table. Conversely, the router is unable to forward packets to any routes (or addresses) that are not identified in the forwarding table. Typically, the forwarding table contains a list of explicitly defined routes to which packets may be forwarded, and/or a default route to which the router can forward packets that do not match any of the explicitly defined routes.

Co-pending and co-assigned U.S. patent application Ser. No. 09/662,108, filed on Sep. 14, 2000, and entitled "Exclusion Routes in Border Gateway Protocol" (BGP), teaches a method of controlling traffic within a BGP network by means of "exclusion" routes, which can be entered into the forwarding table in a conventional manner, but which explicitly define routes to which traffic may not be forwarded. This modifies the effect of default routes, thereby allowing control over traffic flows within the network, while at the same time maximizing performance by minimizing the size of the forwarding table maintained by each BGP router. For example, an exclusion route can be defined in the forwarding table of the ASBR 12 (which is a BGP router) such that packets originating in the autonomous system 2 and destined for one or more "restricted" addresses in the communications network 10 are discarded by the ASBR 12. Similarly, exclusion routes may be defined such that packets originating in the communications network 10 and destined for selected addresses in the autonomous system 2 are discarded by the ASBR 12.

The use of explicitly defined exclusion routes, as described in U.S. patent application Ser. No. 09/662,108, provides enhanced control over BGP traffic, and thus can be used for engineering and policing of traffic entering and leaving the autonomous system 2.

A limitation of the arrangement of U.S. patent application Ser. No. 09/662,108 is that the implementation of policy-based traffic forwarding by means of BGP exclusion routes affects the entire autonomous system equally. In many instances, it is desirable to implement different policy-based traffic forwarding regimes (e.g. providing different levels of access and security) in different areas of an autonomous system. For example, an enterprise may wish to partition its enterprise LAN into discrete areas, each having respective different levels of security and public access. In the Autonomous system illustrated in FIG. 1, for example, Area 0.0.0.1 4*a* may be used to provide secure space for employees, and Area 0.0.0.2 4*b* used by accounting and corporate finance departments. Both of these areas 4*a*,4*b* must therefore be carefully protected against unauthorized access. On the other hand, Area 0.0.0.3 4*c* may be used for distribution of product information, and handling customer inquiries and product orders, and therefore must be readily accessible from the communications network 10. It is desirable for internal routers 14 located in Areas 0.0.0.1 and 0.0.0.2 4*a* and 4*b*, respectively, to obtain route information concerning addresses within Area 0.0.0.3 4*c*, in order to enable maintenance and other administrative functions. However, in order to maintain security, it is important that internal routers 14 within Area 0.0.0.3 4*c* be unable to access addresses within Areas 0.0.0.1 and 0.0.0.2 4*a* and 4*b*.

One method of accomplishing this is to manually configure the respective forwarding tables of ABR(A) 8*a* and ABR(B) 8*b* to include only explicitly defined inclusion routes to which traffic may be forwarded. However OSPF normally operates to advertise new and/or changed addresses throughout the autonomous system by flooding LSAs from the router hosting the new addresses. Thus manually configuring the respective forwarding tables of ABR(A) 8*a* and ABR(B) 8*b* with explicitly defined routes requires that the conventional route-learning functionality of OSPF be defeated. This creates scalability and network maintenance difficulties as the configuration of the autonomous system changes.

Request for Comments (rfc)-2740 describes OSPF for IP version 6, which attempts to overcome some of the limitations of autonomous system-wide propagation of LSAs, by allowing a router originating the LSA to restrict propagation of the LSA to a link, a local area, or the entire autonomous system. However, this functionality cannot accommodate a situation in which it is desired to selectively propagate an LSA into some areas of the autonomous system, but not others. For example, the autonomous system of FIG. 1 contains three areas 4, and it is desired that LSAs originating in Area 0.0.0.1, be propagated to Area 0.0.0.2 to enable nodes in Area 0.0.0.2 to access addresses in Area 0.0.0.1. However, it is important that these same LSAs be prevented from propagating into Area 0.0.0.3, and so prevent unauthorized access to addresses in Area 0.0.0.1 from the (publicly accessible) Area 0.0.0.3.

Accordingly, a method and apparatus for enabling flexible control of traffic forwarding within an OSPF network, while ensuring a high level of security and scalability, remains highly desirable.

SUMMARY OF THE INVENTION

An object of the invention is to provide a method of policy-based control of traffic forwarding within a data network.

Accordingly, an aspect of the present invention provides a method of enabling policy-based traffic forwarding in a data network. A route tag is asserted in respect of a Link State Advertisement (LSA) message.

Propagation of the LSA through the data network is controlled using the asserted internal route tag.

Another aspect of the present invention provides a router adapted for enabling policy-based traffic forwarding in a data network, the router comprising means for controlling propagation of a link state advertisement (LSA) message through the data network using a route tag asserted in respect of the LSA.

In embodiments of the invention, the data network is an Open Shortest Path first (OSPF) network. The router may be an Autonomous System Border Router (ASBR) or an Area Border router (ABR) of the OSPF network.

The route tag may include either one of: an internal route tag associated with an address located within an autonomous system of the data network; and an external route tag associated with an address located outside the autonomous system.

Assertion of the route tag may include: setting a route tag value respecting the LSA; and inserting the route tag valve into a predetermined field of the LSA. The route tag value may be set by a policy having a match criteria corresponding to a predetermined parameter of the LSA. The predetermined parameter may include any one or more of: a source address; a source area; a destination address; and a destination area.

Control over propagation of the LSA may include implementing a forwarding policy having a match criteria corresponding to the asserted route tag. The forwarding policy may correspond to one of: a pass decision, in which the LSA is forwarded to a downstream link; and a discard decision, in which the LSA is discarded without forwarding.

Implementation of the forwarding policy may also include updating a forwarding table using information contained in the LSA as one of: an inclusion route; and an exclusion route.

Thus the present invention provides a method and apparatus for policy-based control of traffic forwarding by the use of policies implemented to control the propagation of LSAs containing route information. LSAs containing information concerning restricted or prohibited addresses can be discarded by an ABR, in response to a policy decision, so that downstream nodes remain unaware of the restricted addresses. This functionality can be used, for example, to prevent information concerning an address within Area 0.0.0.1 being propagated to any nodes beyond ABR(A), so that nodes within Area 0.0.0.3 remain unaware of (and thus cannot forward traffic to) that address.

BRIEF DESCRIPTION OF THE DRAWINGS

Further features and advantages of the present invention will become apparent from the following detailed description, taken in combination with the appended drawings, in which:

FIGS. 3*a*-3*c* are block diagrams schematically illustrating fields of exemplary LSA messages usable in the present invention.

It will be noted that throughout the appended drawings, like features are identified by like reference numerals.

DETAILED DESCRIPTION OF THE PREFERRED EMBODIMENT

Figure 1:
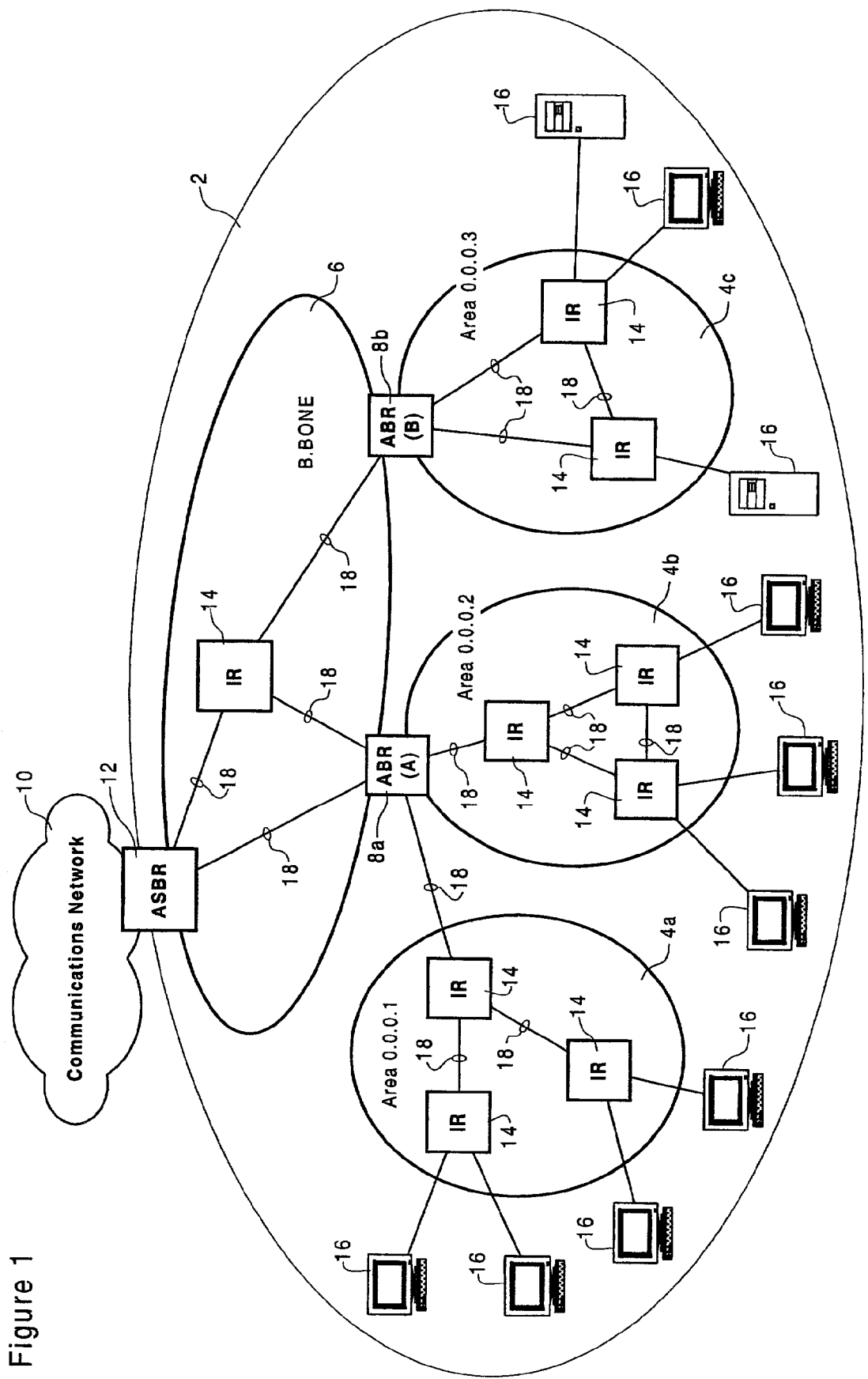
FIG. 1 is a block diagram schematically illustrating an autonomous system in which the present invention may be utilized.

The present invention provides a method and a system (which may take the form of, for example, a router and/or a computer program adapted for controlling the router) for policy-based control of traffic forwarding within an autonomous system. FIG. 1 illustrates an exemplary autonomous system 2 in which the present invention may be deployed. In the embodiment of FIG. 1, the autonomous system 2 includes three areas (Area 0.0.0.1, Area 0.0.0.2 and Area 0.0.0.3) 4a-4c that are linked to a backbone network 6 via one or more respective Area Border Routers (ABRs) 8. The autonomous system 2 is coupled to an external communications network 10 (such as the public internet) via an Autonomous System Border Router (ASBR) 12. Each area 4 includes one or more Internal Routers (IRs) 14, which control the forwarding of traffic among user machines 16 (e.g. PCs, not shown) and the ABRs 8 hosting the area 4. The routers 8,12,14 are coupled together by links 18 (which may be physical or logical links) through which packetized data traffic is forwarded.

The topology of the autonomous system 2 illustrated in FIG. 1 is typical of enterprise and/or campus Local Area Networks (LANs), in which various network areas 4 (e.g. department-specific LANs) are connected to each other, and to an external communications network 10, such as a Wide Area network (WAN) and/or the public internet, via a backbone 6. In the embodiment of FIG. 1, three areas 4 are illustrated. These areas 4 are connected to the backbone 6 via two ABRs 8, namely: ABR(A) 8a, which connects Areas 0.0.0.1 and 0.0.0.2 4a and 4b, respectively, to the backbone 6; and ABR(B) 8b, which connects Area 0.0.0.3 4c to the backbone 6. A single ASBR 12 is provided to enable traffic flow between the autonomous system 2 and the external communications network 10. It will be appreciated, however, that the present invention may be successfully deployed in networks 2 having any number of areas 4, each of which may be connected to the backbone 6 via one or more ABRs 8, which may be shared with one or more other areas 4. Accordingly, the autonomous system 2 of FIG. 1 shall be viewed as being illustrative, rather than limitative, of the types of ASs in which the present invention may be deployed.

Figure 2:
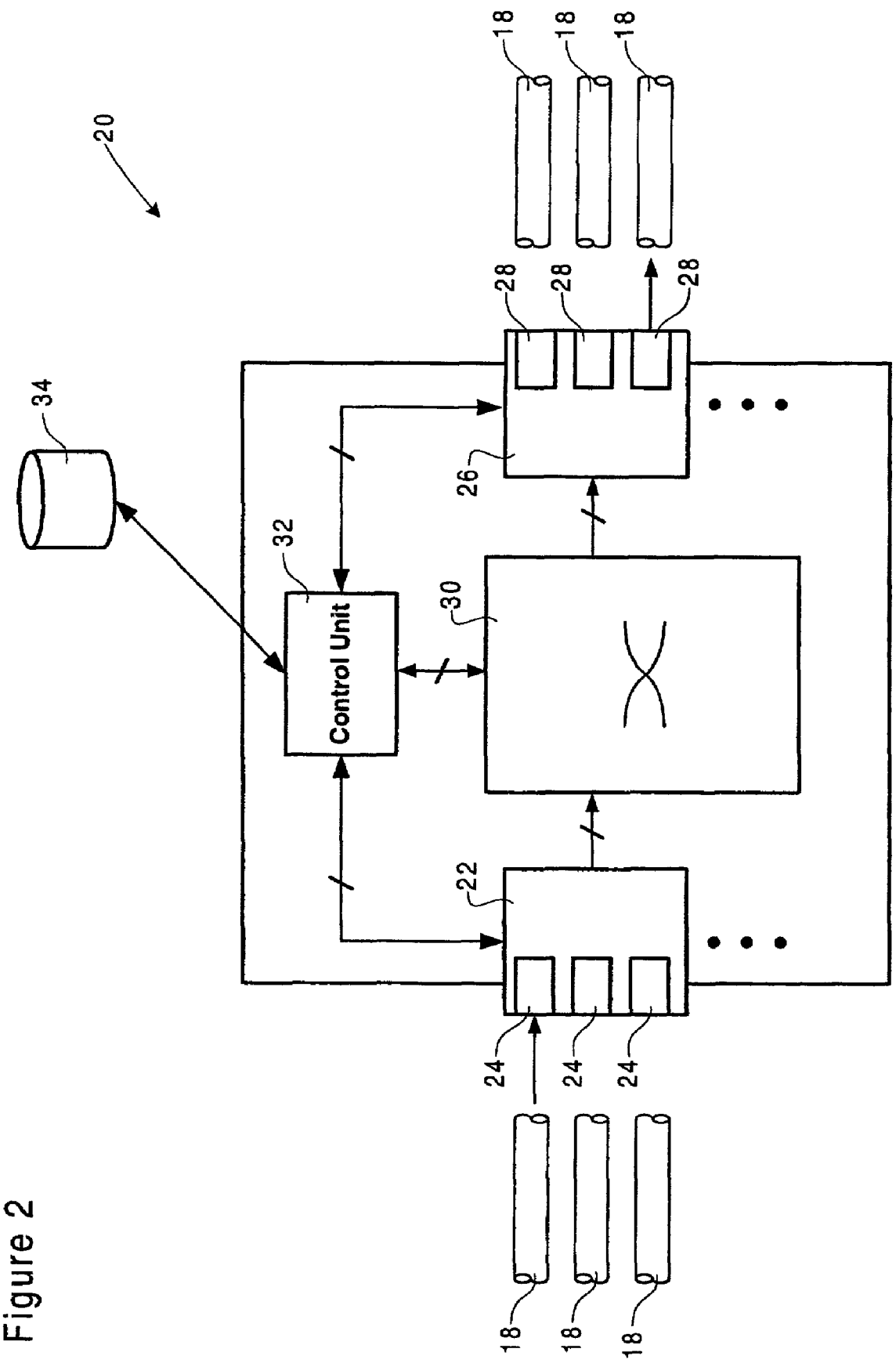
FIG. 2 is a block diagram schematically illustrating exemplary elements of a router in accordance with the present invention.

FIG. 2 is a block diagram schematically illustrating elements of an exemplary router 20 in accordance with the present invention. The router 20 may be deployed as any ABR 8, ASBR 12, or IR 14, and operates to control the forwarding of traffic through the autonomous system 2. As shown in FIG. 2, the router 20 generally comprises at least one ingress network interface 22, each of which provides one or more ingress ports 24 for receiving data traffic through upstream links 18 of the AS 2; at least one egress network interface 26, each of which provides a plurality of egress ports 28 for launching data traffic into downstream links 18 of the AS 2; a switch fabric 30 for mapping traffic received at an ingress port 24 to a selected egress port 28 for forwarding to an appropriate downstream link 18; and a control unit 32 for controlling operations of the ingress and egress interfaces 22,26 and ports 24,28, and the switch fabric 30.

The router 20 may be implemented as physical hardware or as a virtual router instantiated in a server (not shown), for example. Similarly, the ingress and egress interfaces 22,26 and ports 24,28, switch fabric 30, and the control unit 32 may be implemented by any suitable combination of hardware and/or software. In order to simplify illustration and description of the present invention, FIG. 2 shows only one each ingress and egress interface 22,26, each of which provides three respective ports 24,28. However, it will be understood that, in general, a router 20 will include multiple ingress and egress interfaces, and each interface will provide multiple ports. Similarly, in order to simplify description, a unidirectional traffic flow is illustrated within the router. Thus inbound data traffic is received from an upstream link 18 by an ingress interface 22 through a respective ingress port 24, mapped through the switch fabric 30 to an egress interface 26, and then launched into a downstream link 18 through an egress port 28. It will be appreciated, however, that traffic flows will, in general, be bi-directional. Accordingly, the router 20 of FIG. 2 shall be viewed as being illustrative, rather than limitative, of routers in accordance with the present invention.

The control unit 32 is logically connected to a database 34, which contains one or more forwarding tables, translation tables, policies, and/or any other information used for enabling flow-specific processing of data traffic through the router 20. The database 34 may be co-resident with the router 20, or remotely located and accessible by the router 20 through the AS 2. As is known in the art, the control unit 32 operates, typically under software control, to update the contents of the database 34 (principally the forwarding table), based on the contents of Link State Advertisement (LSA) messages advertised by other routers. As data packets are received at an ingress port 24, the contents of the packet header (e.g. the destination address) are read by the ingress interface 22 and used to query the database 32 in order to determine how the packet should be routed. Based on the query result, the control unit 32 interacts with the ingress interface 22, switch fabric 30 and/or the egress interface 26, to either forward the packet to an appropriate downstream link 18, or, under some conditions, discard the packet.

Traffic forwarding between the autonomous system 2 and the external communications network 10 is controlled by the ASBR 12 using route information contained in update messages conforming to an Exterior Gateway Protocol (EGP) such as, for example, Border Gateway Protocol (BGP) in a manner known in the art. Thus, for example, the ASBR 12 may obtain information concerning addresses and routes within the external communications network via BGP update messages received from the external communications network 10. Conversely, the ASBR 12 may advertise information concerning addresses and routes within the autonomous system 2 by formulating and launching BGP update messages into the external communications network 10.

Traffic forwarding within the autonomous system 2 is controlled by the ABRs 8 and IRs 14 using respective forwarding tables, which are populated with route information using an Interior Gateway Protocol (IGP) such as, for example, Open Shortest Path First (OSPF) protocol. Thus, for example, the ASBR 12 can advertise information concerning external addresses and routes (i.e. those outside the autonomous system 2) to the autonomous system 2 using Type-5 (and/or Type-7) OSPF Link State Advertisement (LSA) messages. Similarly, ABR(A) 8a may advertise information concerning addresses and routes within Areas 0.0.0.1 4a and 0.0.0.2 4b to other portions of the autonomous system 2, and to the ASBR 12, using Type-3 LSA messages. Under conventional OSPF, LSA messages can be originated by the ASBR 12, ABRs 8 or IRs 14, and are "flooded" into the autonomous system 2. In this respect, the term "flooded" means that the LSA message is launched towards every adjacent router, and thereafter propagates, hop-by-hop, through the entire autonomous system 2. At each router, the respective forwarding table is updated based on the contents of the LSA message. Under OSPF for IP version 6 (described in rfc-2740), this flooding behavior is modified by enabling the originating router to restrict propagation of the LSA to a single hop, the local area 4 within which the originating router resides, or the entire autonomous system 2.

The present invention enables policy-based control over traffic forwarding within the autonomous system 2, by implementing policy-based control over the propagation of LSA messages. This policy-based control is implemented on a per-router basis, so that it is possible to define different forwarding policies for respective different routers. Thus, for example, different policies can be defined for each of ABR(A) 8*a* and ABR(B) 8*b*, so that LSAs originating from the ASBR 12 are treated differently by each of these ABRs 8. In general, policy-based forwarding of LSAs can be implemented in the ASBR 12 and ABRs 8, while conventional flooding is used within each individual area 4, and within the backbone 6. In this case, policies need only be defined in respect of Type-5 and Type-7 LSAs (originated by the ASBR 12 to advertise external route information) and Type-3 LSAs (originated by each ABR 8 to advertise internal route information). Each of these cases is described in greater detail below with reference to FIGS. 3*a*-3*c*.

FIG. 3*a* is a block diagram illustrating the fields of a standard OSPF LSA header 36. These fields are described in detail in Moy, J., "OSPF Version 2", STD 54, RFC-2328, April 1998, and summarized as follows:

LS age 38: The time in seconds since the LSA was originated.

Options 40: The optional capabilities supported by the described portion of the routing domain.

LS Type-42: The type of the LSA. Each LSA type has a separate advertisement format. The LSA types defined in RFC-2328 are as follows

| LSA Type | Description |
|---|---|
| 1 | Router-LSAs |
| 2 | Network-LSAs |
| 3 | Summary-LSAs (IP network) |
| 4 | Summary-LSAs (ASBR) |
| 5 | AS-external-LSAs |

As mentioned previously, Type-3 LSAs are originated by ABRs 8 in respect of routes internal to the autonomous system 2, while Type-5 LSAs are originated by the ASBR 12 in respect of routes external to the autonomous system 2.

Link State ID 44: This field identifies the portion of the internet environment that is being described by the LSA. The contents of this field depend on the LSAs LS type. For example, in network-LSAs the Link State ID is set to the IP interface address of the network's Designated Router (from which the network's IP address can be derived).

Advertising Router 46: The Router ID of the router that originated the LSA. For example, in network-LSAs this field is equal to the Router ID of the network's Designated Router.

LS sequence number 48: Detects old or duplicate LSAs. Successive instances of an LSA are given successive LS sequence numbers.

LS checksum 50: The Fletcher checksum of the complete contents of the LSA, including the LSA header but excluding the LS age field.

Length 52: The length, in bytes, of the LSA, including the LSA header.

In general, policies can be defined using match criteria corresponding to any one or more attributes of an LSA. These attributes may include predetermined contents of any one or more of the fields 38-52 of the LSA header 36. Policies can also be defined using match criteria corresponding to other attributes related to the route, but not forming part of the LSA. Exemplary attributes of this type include the source protocol, and BGP-AS. Thus, for example, a "Discard" policy may be defined for ABR(B) 8*b* having a match criteria corresponding to the address of ABR(A) 8*a* as the contents of the advertising router field 46, such that LSAs originating from ABR(A) 8*a* are discarded. Implementation of such a policy in ABR(B) 8*b* would mean that information concerning address and routes within Areas 0.0.0.1 4*a* and 0.0.0.2 4*b* would not be propagated into Area 0.0.0.3 4*c*, thereby ensuring that Areas 0.00.1 and 0.0.0.2 4*a*,4*b* cannot be accessed from Area 0.0.0.3 4*c*, Additionally, policies can be defined using match criteria corresponding to the contents of any one or more fields specific to each type of LSA. For example, as shown in FIGS. 3*b* and 3*c*, Type-5 LSAs 54 include Network Mask 56, Forwarding Address 58 and External Route Tag 60 fields, while Type-3 LSAs 62 contain a Network Mask field 64, the contents of any one or more of which may be used as match criteria for forwarding policies in the manner described above.

In accordance with an embodiment of the invention, an advertising router (e.g. ASBR 12 or an ABR 8) operates (e.g. under software control) to define a route tag in respect of each LSA originating from the router. The route tag is attached to each LSA, and is used as a match criteria for policy-based forwarding of the LSA through at least the ASBR 12, ABR(A) 8*a* and ABR(B) 8*b*.

For Type-5 LSAs 54 (FIG. 3*b*), which convey information concerning external routes, the ASBR 12 can conveniently insert the route tag into the External Route Tag field 60 of the LSA 54. Policies defined for each of ABR(A) 8*a* and ABR(B) 8*b*, and having match criteria corresponding to the contents of the External Route Tag field 60 of Type-5 LSAs 54, can then be used to control the advertisement of external routes into each of the areas 4*a*-4*c* of the autonomous system 2.

In order to accommodate the route tag in Type-3 LSAs 62, a suitable internal route tag field must be added, for example, following the TOS Metric Field 66 (see FIG. 3), to thereby create a "modified" Type-3 LSA. Accordingly, a route tag defined by ABR(A) 8*a*, for example, can be inserted (as an internal route tag) into the internal route tag field of the modified Type-3 LSA 62. Policies defined for the ASBR 12 and ABR(B) 8*b*, and having match criteria corresponding to the contents of the internal route tag field of modified Type-3 LSAs 62, can then be used to control the advertisement of internal routes (in this example, within Areas 0.0.0.1 and 0.0.0.2 4*a* and 4*b*) into the external communications network 10 and Area 0.0.0.3 4*c*, respectively.

In general, the actions performed by a forwarding policy may be arbitrary, and thus may be selected as desired for each particular implementation. Policies may also differ on a per-router basis. Exemplary actions include:

Pass, in which the LSA is forwarded to a downstream link; and

Discard, in which the LSA is discarded without forwarding.

In addition to the above exemplary policy actions, the forwarding table may be updated with route information contained in the LSA. This route information may identify a route as either an inclusion route or an exclusion route, as desired. Updating the database 34 may also be based on a policy decision, using any suitable desired attribute (or combination of attributes) of the LSA, as discussed above, such as, for example, the contents of the advertising router field 46 and/or the route tag (i.e. the contents of the external route tag field 60 of Type-5 LSAs 54 or the internal route tag field 66 of Type-3 LSAs 62). Alternatively, an exclusion route flag may be defined and inserted into the LSA by the advertising router. The exclusion route flag may, for example, include a binary "0" or "1", inserted into an unused portion of the options field 40 of the LSA header 36 (see FIG. 3a). As a result, the route identified in the LSA can be marked (e.g. in the forwarding table) as an inclusion or an exclusion route, as appropriate, based on the value of the exclusion route flag. Once the route has been marked as an exclusion route, a router cannot re-set the route, or otherwise override a route policy decision to discard LSA destined for the exclusion route.

Thus it will be seen that the present invention provides a method and apparatus for policy-based control of traffic forwarding within an autonomous system 2, by implementing policy-based propagation of LSAs through the AS 2. This does not require altering the conventional OSPF protocol, but rather can be accomplished by extending the functionality of ASBRs 12 and ABRs 8 to implement policies based on the contents of Type-3 and Type-5 LSAs. Thus the functionality of ASBRs 12 can be extended to implement forwarding policies based on the contents of an internal route tag field 66 of modified Type-3 LSAs 62 advertised by an ABR 8. Similarly, the functionality of ABRs 8 can be extended to: define and insert an internal route tag into modified Type-3 LSAs 62; and to implement forwarding policies based on the contents of the external route tag field 60 of Type-5 LSAs 54, and the internal route tag field 66 of modified Type-3 LSAs 62 advertised by other ABRs 8. Accordingly the present invention can be readily deployed within new autonomous systems, and/or as a software up-grade of legacy routers in existing autonomous systems.

The embodiment(s) of the invention described above is(are) intended to be exemplary only. The scope of the invention is therefore intended to be limited solely by the scope of the appended claims.

We claim:

1. A method of enabling policy-based traffic forwarding in a data network having at least two area border routers (ABRs), the method comprising steps of:
    generating a link state advertisement (LSA) message, and asserting a route tag in respect of the generated LSA message; and
    at each ABR receiving the LSA message, controlling propagation of the received LSA, into an area of the data network hosted by the ABR, using a respective forwarding policy having a match criteria corresponding to the asserted route tag;
    wherein the respective forwarding policy of a first ABR differs from that of a second ABR, such that the received LSA message is flooded into the area hosted by the first ABR, and not flooded into the respective area hosted by the second ABR.

2. A method as claimed in claim 1, wherein the data network is an Open Shortest Path first (OSPF) network.

3. A method as claimed in claim 1, wherein the route tag comprises one of:
    an internal route tag associated with an address located within an autonomous system of the data network; and
    an external route tag associated with an address located outside the autonomous system.

4. A method as claimed in claim 1, wherein the step of asserting a route tag comprises steps of:
    setting a route tag value respecting the generated LSA; and
    inserting the route tag value into a predetermined field of the generated LSA.

5. A method as claimed in claim 4, wherein the route tag value is set by a policy having a match criteria corresponding to a predetermined attribute of the generated LSA.

6. A method as claimed in claim 5, wherein the predetermined attribute comprises any one or more of: a source address; a source area; a destination address; and a destination area.

7. A method as claimed in claim 4, wherein the generated LSA is a Type-5 LSA, and the step of inserting the route tag comprises a step of inserting the route tag value into an external route tag field of the generated LSA.

8. A method as claimed in claim 4, wherein the step of inserting the route tag comprises a step of inserting the route tag value into an internal route tag field of a modified Type-3 LSA.

9. A method as claimed in claim 1, wherein the forwarding policy corresponds to one of:
    a pass decision, in which the received LSA is forwarded to a downstream link; and
    a discard decision, in which the received LSA is discarded without forwarding.

10. A method as claimed in claim 9, wherein implementation of the forwarding policy further comprises a step of updating a forwarding table using information contained in the received LSA as either one of an inclusion route; and an exclusion route.

11. A router for enabling policy-based traffic forwarding in a data network having at least two routers, the router comprising means for controlling propagation of a received link state advertisement (LSA) message, into an area of the data network hosted by the router, using a respective forwarding policy having a match criteria corresponding to a route tag asserted in respect of the LSA, wherein the forwarding policy of the router differs from that of a second router, such that the received LSA message is flooded into the area hosted by the router, and not flooded into a respective second area hosted by the second router.

12. A router as claimed in claim 11, wherein the data network comprises an Open Shortest Path first (OSPF) network.

13. A router as claimed in claim 12, wherein the router comprises any one of an autonomous system border router, and an area border router.

14. A router as claimed in claim 11, wherein the route tag comprises one of:
    an internal route tag associated with an address located within an autonomous system of the data network; and
    an external route tag associated with an address located outside the autonomous system.

15. A router as claimed in claim 11, wherein the forwarding policy corresponds to one of:
    a pass decision, in which the LSA is forwarded to a downstream link; and
    a discard decision, in which the LSA is discarded without forwarding.

16. A router as claimed in claim 15, wherein the means for implementing the forwarding policy further comprises means for updating a forwarding table using information contained in the LSA as either one of: an inclusion route and an exclusion route.

17. A router as claimed in claim 11, further comprising means for asserting the route tag in respect of the LSA.

18. A router as claimed in claim 17, wherein the means for asserting the route tag comprises:
    means for setting a route tag value respecting the LSA; and
    means for inserting the route tag into a predetermined field of the LSA.

19. A router as claimed in claim 18, wherein the means for setting the route tag value comprises a policy having a match criteria corresponding to one or more predetermined attributes of the LSA.

20. A router as claimed in claim 19, wherein the one or more predetermined attributes comprise any one or more of: a source address; a source area; a destination address; and a destination area.

21. A router as claimed in claim 18, wherein the router is an ASBR, and the means for inserting the route tag is adapted to insert the route tag value into an external route tag field of a Type-5 LSA.

22. A router as claimed in claim 18, wherein the router is an ABR, and the means for inserting the route tag is adapted to insert the route tag value into an internal route tag field of a modified Type-3 LSA.

23. A software program stored on a computer readable medium for controlling a router to enable policy-based traffic forwarding in a data network having at least two routers, each router hosting an area of the data network, the software program comprising program code adapted to control propagation of a received link state advertisement (LSA) message, into a respective area of the data network hosted by the router, using a respective forwarding policy having a match criteria corresponding to a route tag asserted in respect of the LSA, wherein the respective forwarding policy of a first router differs from that of a second router, such that the received LSA message is flooded into the area hosted by the first router, and not flooded into a respective second area hosted by the second router.

24. A software program as claimed in claim 23, wherein the program code adapted to implement the forwarding policy further comprises program code adapted to control the router to update a forwarding table using information contained in the LSA as either one of: an inclusion route and an exclusion route.

25. A software program as claimed in claim 23, further comprising program code adapted to control the router to assert the route tag in respect of the LSA.

26. A software program as claimed in claim 25, wherein the program code adapted to control the router to assert the route tag comprises:

program code adapted to control the router to set a route tag value respecting the LSA; and program code adapted to control the router to insert the route tag into a predetermined field of the LSA.

27. A software program as claimed in claim 26, wherein the router is an ASBR, and the program code adapted to control the router to insert the route tag is adapted to control the router to insert the route tag value into an external route tag field of a Type-5 LSA.

28. A software program as claimed in claim 26, wherein the router is an ABR, and the program code adapted to control the router to insert the route tag is adapted to control the router to insert the route tag value into an internal route tag field of a modified Type-3 LSA.

\* \* \* \* \*